Sept. 4, 1928.  
E. F. PETERSON  
KNEADING MACHINE  
Filed March 27, 1926 5 Sheets-Sheet 1  
1,683,051

INVENTOR  
Erland F. Peterson  
by Fred W. H. Rodle  
att'y

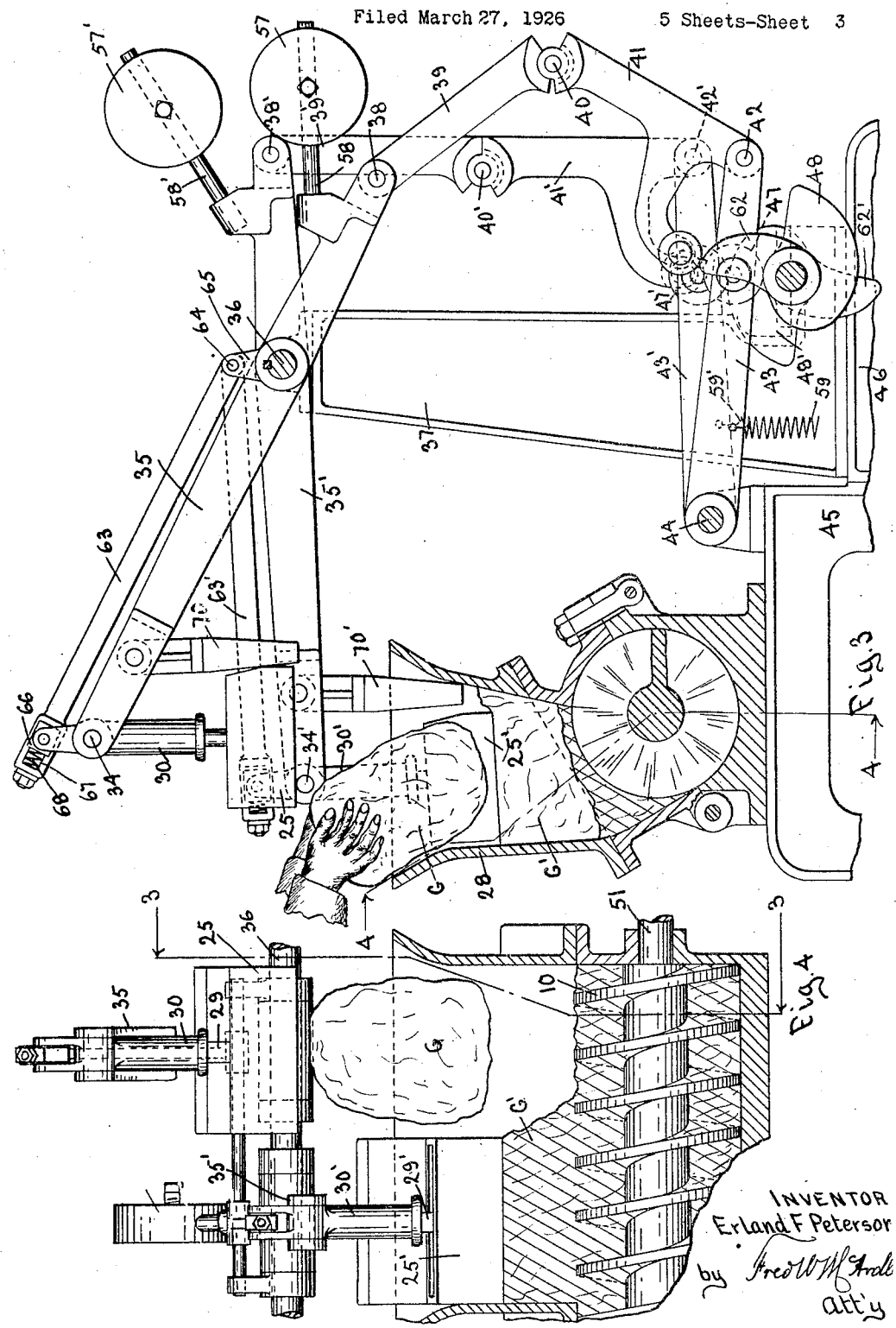

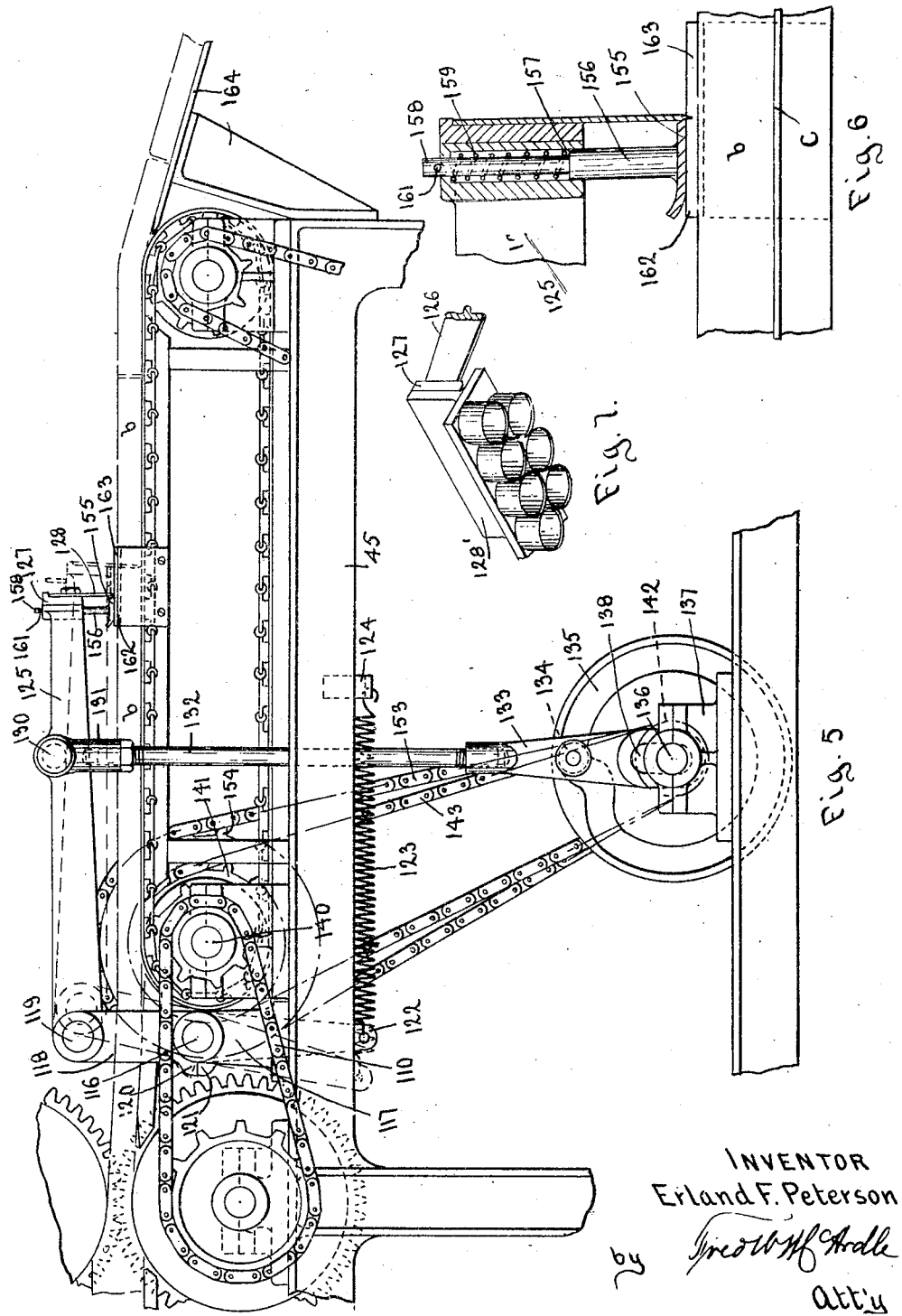

Sept. 4, 1928.  E. F. PETERSON  1,683,051
KNEADING MACHINE
Filed March 27, 1926  5 Sheets-Sheet 5

INVENTOR
Erland F. Peterson
by Fred W. McArdle
att'y

Patented Sept. 4, 1928.

1,683,051

UNITED STATES PATENT OFFICE.

ERLAND F. PETERSON, OF EVERETT, MASSACHUSETTS, ASSIGNOR TO THE GOUDEY GUM COMPANY, OF BOSTON, MASSACHUSETTS.

KNEADING MACHINE.

Application filed March 27, 1926. Serial No. 97,913.

My invention relates to kneading machines, and particularly to the type in which plastic material is supplied to a hopper, kneaded and formed into a continuous band which is then cut into predetermined portions.

This machine is particularly adaptable for use with confectionery, chewing gum, cake and biscuit dough and the like, and slight modifications only are necessary to adapt it to meet conditions. The portions severed from the band of plastic material may be varied in form to produce biscuits, cakes, doughnuts, or plain sections which are to be treated in other apparatus, and I have illustrated and will describe a preferred form of my invention particularly adapted for use in commercially preparing chewing gum, and it will be obvious that modifications to adapt it for use with other plastic compounds, may be made without going beyond the scope of the claims.

One object of my invention is to provide improved devices for forcing the plastic material into the kneading device.

A second object is to provide improved means for dusting the surfaces of the plastic band to prevent adhesion to the conveyor and reducing rolls which I employ.

A third object is to provide means for severing portions from the moving plastic band, without interruption of the continuous motion thereof.

A further object is to provide a kneading machine in which the mechanism will be coordinated to produce a continuous supply of severed portions of predetermined size and form.

My invention consists in the novel combination of elements and mechanism coordinated in its operation to accomplish the objects stated.

In the accompanying specifications and claims, and the drawings forming a part thereof, I have described and illustrated a preferred form of my invention.

In the drawings:—

Fig. 3 is a similar sectional elevation on 3—3 Fig. 4 showing the position of the plungers at the time in the cycle of operations when plastic material is supplied to the hopper.

Fig. 4 is a section on 4—4 Fig. 3.

Fig. 5 is an enlarged elevation of the severing device, and its manner of operation.

Fig. 6 is a fragment further enlarged to shown the device for stripping the plastic from the severing blade.

Fig. 7 is a modified form of the severing member, showing its application to such products as biscuits and cakes.

Figure 1:
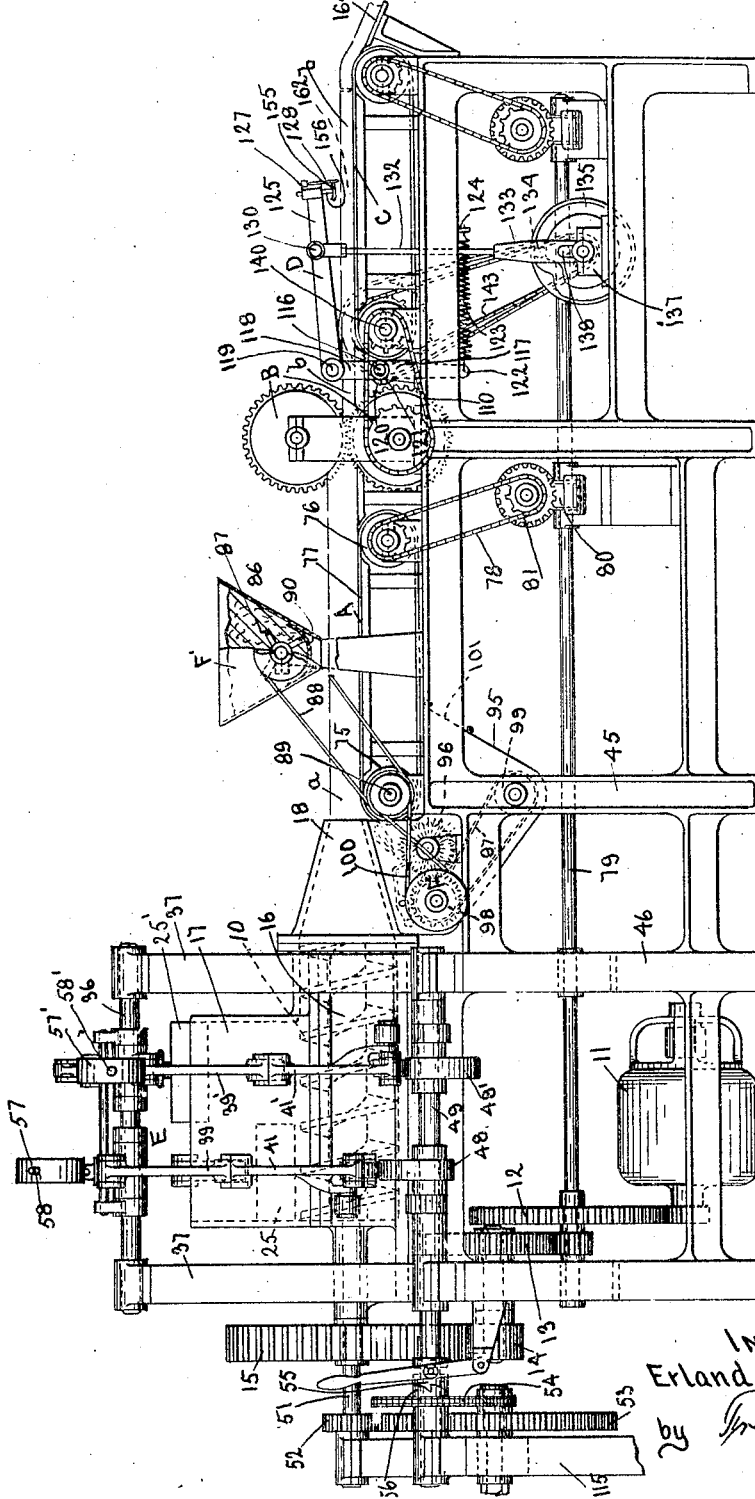
Fig. 1 is a side elevation of a kneading machine embodying my invention.

In the drawings, the helical kneading member 10 is rotated from the prime mover 11 by means of intermediate reducing gears 12, 13, 14, 15. The kneading member is rotated in the chamber 16, a hopper 17 being provided for the purpose of supplying plastic material thereto. This plastic material is kneaded as the member is rotated, and is forced through the nozzle 18 in the form of a continuous band $a$ which is carried by the conveyor A to the rolls B.

Passing between these rolls the band of plastic material is reduced in thickness as at $b$. A second conveyor C receives this band, and carries it beneath the severing device D which cuts the band into predetermined portions for subsequent processes.

To insure a uniform thickness of the band of plastic material it is found necessary to apply pressure to the supply of material in the hopper, otherwise the material would be churned by the kneading member without being expelled from the chamber, and I employ the device E for that purpose.

As the band issues from the nozzle, the surfaces are adhesive, and it is necessary to dust these with powdered material. This I do with a device F which dusts the lower surface, and F′ a device of somewhat different character for dusting the upper surface. The several devices are coordinated in operation to produce a continuous succession of severed portions, which are discharged from the conveyor C into a suitable receptacle or onto a suitable conveyor not shown. These several devices will now be described in detail. When plastic material is supplied to the kneading member, the conveyor action thereof is resisted by the reduced area of the outlet nozzle. The resulting action is to knead the plastic into a homogeneous mass. The character of the material is such that without applying pressure to force the material to the kneading member, the material would be churned about in the kneader chamber, and a relatively small amount expelled from the nozzle.

Figure 2:
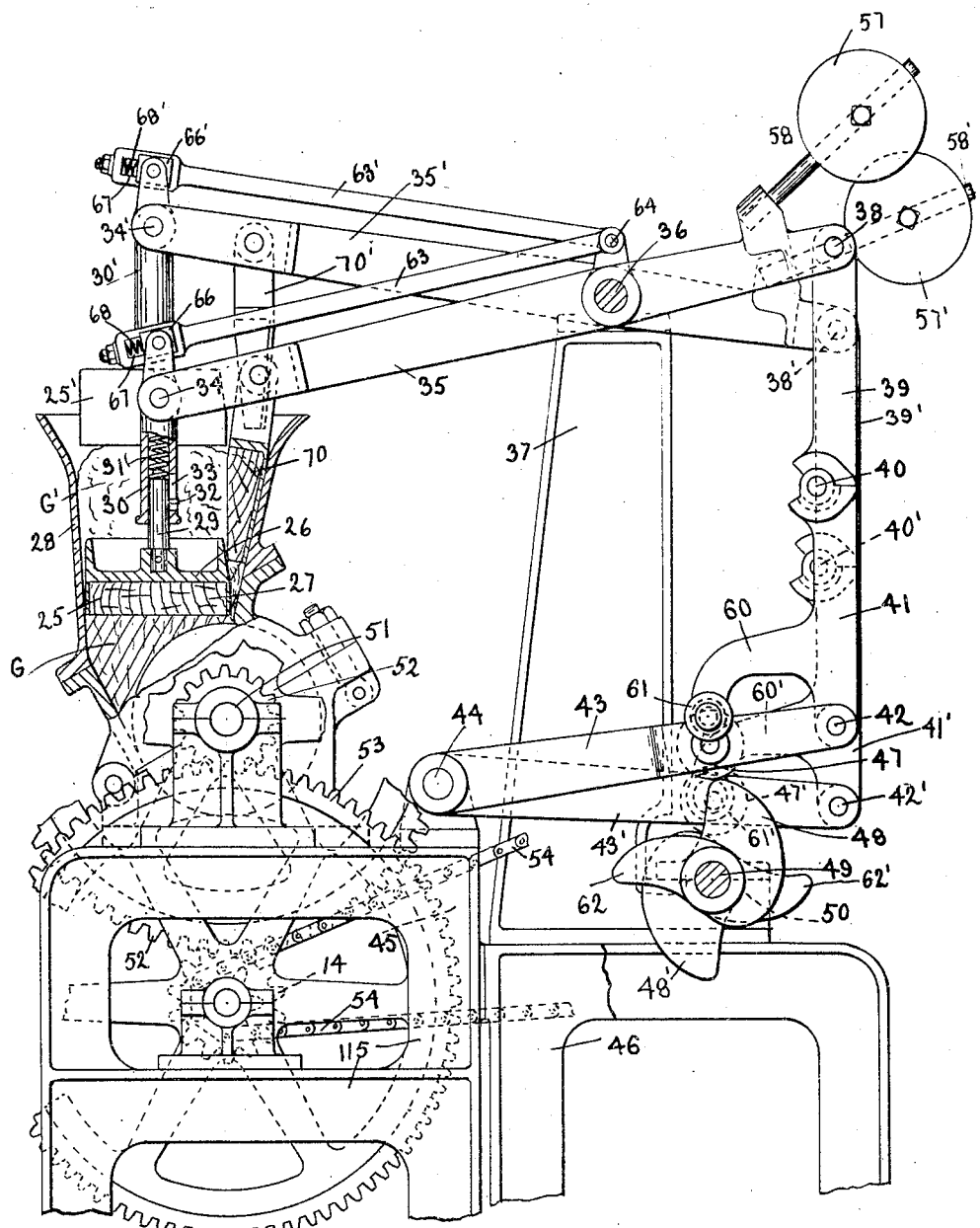
Fig. 2 is an enlarged sectional elevation showing the operation of the pressure plungers.

This tendency I overcome by employing two plungers 25—25' alternating in action on the supply in the hopper, so that one is applying pressure to the supply and the other is withdrawn to permit the introduction of another portion of plastic material. Referring to Fig. 2, the plunger 25 is shown as applying pressure to the plastic supply G and about to be withdrawn; a portion of plastic material G' has been introduced to the hopper and the plunger 25' is beginning to apply pressure. The operation of these plungers is such that an approximately steady pressure is applied to the plastic material in the hopper, which operates to produce a uniform delivery from the nozzle 18. These plungers are alike in character and operation and the following description applies to both. Referring to Figs. 2, 3, 4, the sides of the hopper 17 are flared from the kneading member upwardly to facilitate the introduction of portions of plastic material, and the plungers 25, 25' are each of a size and conformation to approximate one half the area of the bottom of the hopper. Preferably the plungers comprise a metal holder 26, with walls 27, and a filler of hard wood secured to the holder. The walls 27 serve to protect the filler against marring or splintering, and the front wall serves the additional purpose of a scraper to remove adhering plastic from the wall 28 of the hopper. Projecting upwardly from the holder 26 is a stud 29 which slidably engages the connection 30, in which is socketed the spring 31 exerting a yielding pressure on the stud, whose axial movement is limited by the pin 32 engaging the slot 33 formed in the connection 30.

This connection is swiveled at 34 to the forked lever 35, fulcrumed at 36 on a standard 37. The lever is extended beyond the fulcrum 36, and swiveled to this extension at 38 is one member 39 of a toggle connection, hinged at 40 to a second member 41, which is swiveled at its lower end 42 to the forked lever 43, fulcrumed at 44 on a shaft rigid with the frame of the machine 45. Auxiliary frames 46 are secured to this frame and the standard 37 is rigidly mounted thereon.

Rotatably mounted in the fork of the lever 43 is a roll 47, which engages the cam 48 rotatable with the shaft 49, journaled in bearings 50 rigid with the frame 46. This shaft is rotated from the kneader shaft 51, through the medium of gears 52, 53 and the sprocket and chain drive 54, Figs. 1, 2, 3.

I provide a clutch 55 slidable on the shaft 49 and adapted to engage with the hub of the sprocket 56 which is rotatable on the shaft 49. By means of this clutch, the entire pressure device may be disengaged without interfering with other operations. The several elements relating to the plunger 25' are identified in similar manner with like parts relating to the plunger 25. The cams 48—48' respectively operate through the means described, on the plungers 25—25' and are so disposed on the shaft 49 as to produce alternate action of the plungers on the plastic material in the hopper 17. The hinge connection 40 is so disposed relative to the swivel joints 38—42, that a line through these joints, when the cam is operating to apply pressure to the lever 36, passes outside the hinge 40, and the elements 39 and 41 operate as a single pressure member. This particular construction enables me to use a cam with relatively small radial variation, for the purpose of operating the plunger 25, and at the same time I secure an increased upward movement thereof for the purpose of facilitating renewing the supply of plastic material in the hopper, without interference of the plunger. To counterbalance the weight of moving parts I employ the counterweight 57, adjustable on the rod 58 socketed in a projection from the lever 35, and also the spring 59 operating to exert a yielding pull on the lever 43. In order that I may secure the additional upward movement of the plunger, I provide an arm 60, integral with the member 41. On this arm is rotatably mounted a roll 62, engaging a cam 63 rigid with the shaft 49. Referring to Fig. 3, this cam is so disposed on the shaft 49, that as the roll 47 approaches the low position on the cam 48, the roll 61 engages the cam 62, and the member 41 is rotated about the swivel 42; through the hinge 40 and the member 39, the extension of the lever 35 is swung downward and the plunger upward, providing ample space to introduce a portion of plastic material beneath. To secure approximate rectilinear movement of the plunger 25 in the hopper, I employ the radius bar 63, swiveled to a shaft 64, supported in arms 65, rigid with the fulcrum shaft 36. The connection 30 is extended beyond its fulcrum 34 and forked to engage a block 66, swiveled thereto and slidable in the slot 67 formed in the radius bar. A spring 68 exerts a yielding pressure to retain the block against the rear of the slot 67. As the plunger is swung downward, its path will vary from a straight line only to the extent of the arc described by the swivel joint, and the possibility of swinging over and engaging the top of the hopper is eliminated. As the plunger descends, the wall 27 engages the sloping side 28 of the hopper, the spring 68 yielding sufficiently to permit further downward movement, and a scraping action on the inside of the wall 28.

In connection with the plunger 25, I provide an auxiliary plunger 70 swiveled in the fork of the lever 35, and cooperating with the plunger 25 to prevent the plastic material from rising back of it as pressure is applied. The plunger 70 also functions as a scraper for the back wall of the hopper. The plunger 70 is swiveled between the connection 30 and the fulcrum 36 of the lever 35, and therefore swings through a shorter distance than the plunger 25. As the walls of the hopper are flared as hereinbefore stated, there is considerable clearance between the back of the plunger 25 and the back wall near the top. As the pressure is applied to the plastic material in the hopper, there is a tendency for it to overflow the plunger. The auxiliary plunger is therefore so formed, and so swiveled, that its pressing face is nearly in line with the corresponding face of the plunger 25. As the pressure is applied to the plastic material, the auxiliary plunger operates to correct this tendency to overflowing, by partially filling the space between the plunger 25 and the back wall of the hopper. As the plunger 70 passes through a less distance in its movement than the plunger 25 as already explained, in effect it withdraws as the plungers descend and the distance between the plunger 25 and the back wall of the hopper decreases. When the plunger 25 has travelled its maximum downwardly, the gap between it and the back wall is substantially closed, and the auxiliary plunger has operated to press down the plastic which would otherwise rise between the plunger 25 and the back of the hopper and overflow.

As the plastic material is pressed toward the kneading member, the resistance to expulsion from the chamber is overcome and as the kneading member is rotated, the plastic in a homogeneous condition is forced from the nozzle. The shape of the outlet of the nozzle 18 is substantially rectangular, and the plastic material is extruded in the form of a continuous band. As this band issues from the nozzle 18, it is received by the conveyor A which comprises a pair of rolls 75—76 on which is mounted the canvas belt 77. This conveyor is moved at a predetermined speed depending on the volume of delivery from the nozzle 18, by means of the chain drive 78. The rolls may be similarly connected to take undue strain from the belt 77. The chain drive 78 is in turn driven from the prime mover 11 through the medium of the shaft 79 and the worm 80 and gear 81.

As the plastic band issues from the nozzle, the surfaces are adhesive in character, and it is essential that both upper and lower faces of the moving plastic band be dusted with suitable powdered material to prevent adhesion to the conveyor belt and to the reducing rolls between which the band will subsequently pass. At F' Fig. 1, I show a common form of device for dusting the upper surface. This may comprise a hopper in which powdered material is contained.

Journaled in the side walls of this hopper is a shaft 86 to which is secured blades 87. The shaft 86 is rotated by belt and pulley drive 88 from the roll shaft 89. Across the outlet of the hopper is a screen 90, and as the blades are rotated they engage this screen and powdered material is sifted through onto the moving band of plastic material.

The means I adopt for dusting the lower surface of the plastic band is as follows:—

Figures 8, 9:
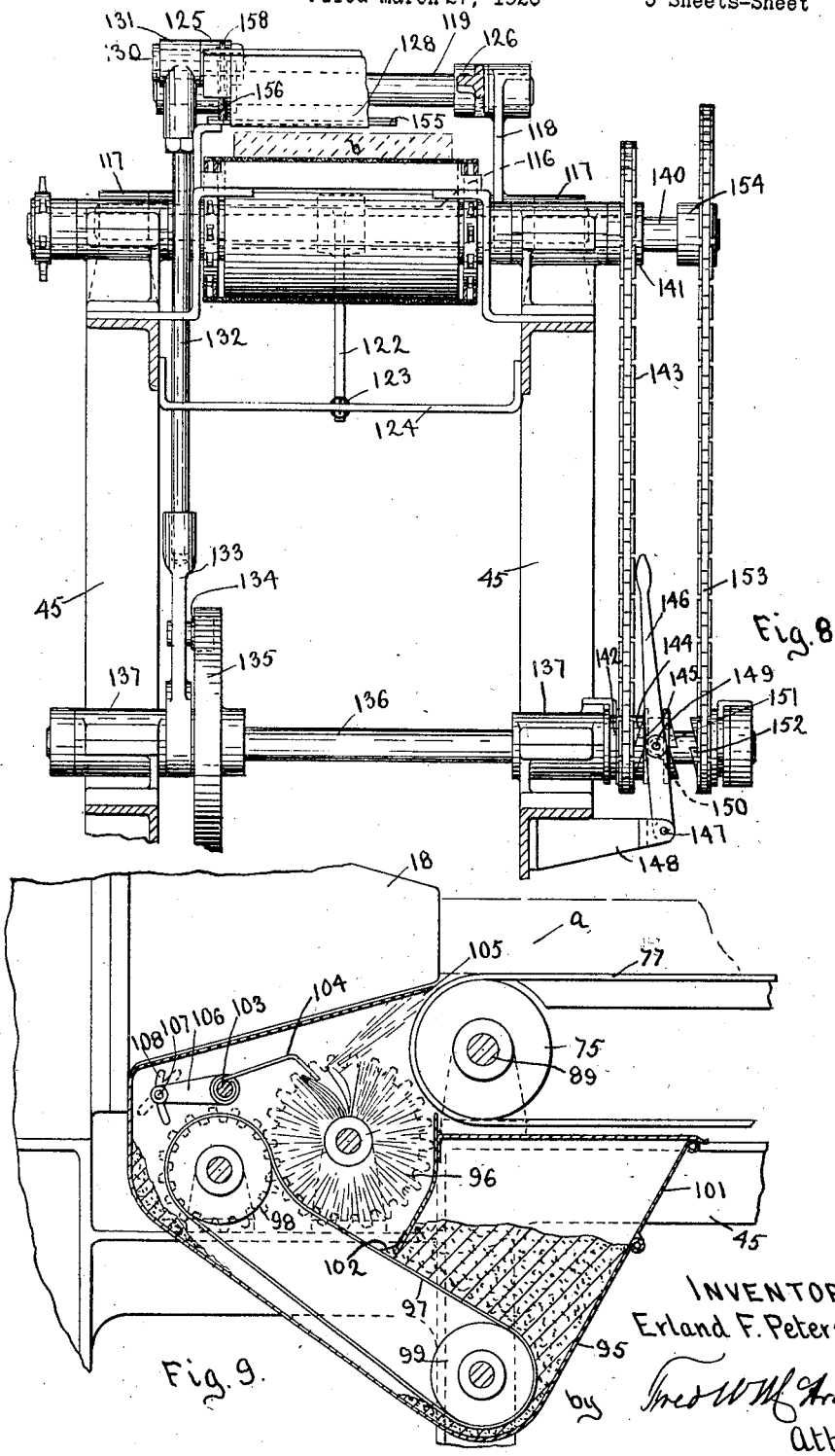
Fig. 8 is an end elevation of the severing device.
Fig. 9 is an elevation with parts broken away of my device for dusting the lower face of the moving plastic band.

Referring to Figs. 1 and 9, 75 is the conveyor roll and 77 the belt carrying the plastic band. The bin 95 serving as a container for powdered material is provided with a cylindrical brush 96, rotatably mounted therein. This brush engages the belt 97 supported by rolls 98—99, the former being rotated from the roll shaft 89 by the belt drive 100.

The roll 98 and the brush 96 are geared together in order that the peripheral movement of the brush shall be substantially the same as the movement of the belt 97. The roll 99 is rotatably mounted in the bin 95 in a position in which powdered material introduced to the bin through the gate 101 will cover the belt and serve as a supply for an appreciable time. As the belt 97 is moved as explained, a film of powdered material adheres and is transferred to the bristles of the brush roll, the scraper 102 limiting the thickness of the film carried by the belt. Secured on the cross shaft 103, journaled in the sides of the bin 95, is a blade 104. This blade is adapted to engage the brush roll and bend the bristles as the brush rotates. As the individual bristles engage this blade, they are bent from a radial position, springing back to normal position as they pass beyond the blade as the brush is rotated. As the bristles spring back to normal position, adhering powder is thrown off. The brush roll is so disposed that the powder is discharged through the annular opening 105 and impinges the under side of the plastic band $a$ close to its junction with the conveyor belt 77, a portion of the powder striking and adhering to the belt, thus contributing to the result desired. Secured to the shaft 103 is an arm 106 tapped near its other end to receive a binding screw 107, which passes through a slot formed in the side of the bin at 108.

By this means the blade may be swung to engage with the brush roll to a greater or less degree, and clamped in adjusted position. The conveyor belt 77 carries the plastic band *a* forward to the rolls B, geared together and rotated by the chain drive 110, from the roll shaft of a second conveyor C, imilar to conveyor A, and similarly moved. The rolls B operate to reduce the thickness of the plastic band *a* and the band as reduced at *b* is carried forward by the conveyor C. As the volume of plastic material issuing from the nozzle 18 is constant, the rate of movement of the conveyors A and C, and the peripheral speed of the rolls B are coordinated to insure a uniform thickness of the plastic band *b* as it is moved onward by the conveyor C. This is done by varying the sizes of the several sprockets in the respective chain drives. As the plastic belt is moved forward on the conveyor C, it is severed into portions that may be conveniently manipulated in subsequent processes.

This severing operation must be performed while the plastic band is in continuous movement, and in Figs. 1, 5 and 8 I have illustrated a preferred method of doing this.

The frame work of the machine is made up of two main side members 45, preferably single units, suitably spaced and connected by cross members which also serve to support the bearings for the shaft 79. On this frame work as assembled, is mounted the chamber 16, and the several devices A, B, C, D, F and F'. Auxiliary frames 46 are rigidly secured to one of the members 45, and support the standards 37 and the bearings for the cam shaft 49. A separate frame 115 rigid relative to the main frame, supports the bearings in which are journaled the outer ends of the kneader shaft, and the cam shaft, also the stud forming a journal for the gear 53. Referring now to the severing device, 116 is a cross shaft journaled in bearings 117 rigid with the frames 45. To this shaft is secured the arms 118, in which are journaled the shaft 119. The arms 118 are formed with projections 120 which engage corresponding projections 121 from the bearings 117, for the purpose of limiting the rotation of the shaft 116 in one direction. Rigid with this shaft is a lever 122, and to this lever is attached one end of the spring 123, which is secured at its other end to the cross bar 124, rigid with the main frame work. This spring operates to retain the projections 120 and 121 in contact normally.

Secured to the shaft 119 are arms 125, 126, connected at the other ends by the cross bar 127. When this machine is used in connection with confectionery, chewing gum and the like, it is found convenient to sever the band of plastic *b* into convenient sized blocks, which are subsequently supplied to other apparatus for further processes required to produce the article in commercial form. In such cases the severing member is in the form of a blade 128, which is secured to the cross bar 127. This blade spans the moving band of plastic *b*, its cutting edge normally clearing the upper surface. In Fig. 7 I show a modification of the severing member which may be used with bakery products such as biscuits, doughnuts, cakes and the like.

In this modification I substitute for the blade 128, the holder 128' on which are mounted formed cutters of the required shape and size; perforations, not shown, through the holder 128', permit the escape of entrained air as the cutters engage the plastic band. A description of the severing operation as applied to the blade 128, will apply equally to the modification. Projecting from the arm 125, is a stud 130 on which is swiveled one end of the connection 131. The rod 132 is threaded on both ends to engage with the end 131 and the member 133, for purposes of adjustment. Rotatably mounted on the member 133 is the roll 134, engaging the cam 135 rotatable with the shaft 136, which is journaled in bearings 137 secured to the frames 45. The member 133 is slotted at 138 and through this slot the shaft 136 passes serving to guide the connection approximately radially as the cam roll is operated by the cam 135. The shaft 136 is rotated from the roll shaft 140 through the medium of the sprockets 141—142 and the chain 143. The sprocket 142 is rotatable on the shaft 136 and its hub is provided with clutch teeth 144, Fig. 8, which are adapted to be engaged by corresponding clutch teeth on the collar 145, slidable on the shaft 136 and rotatable therewith. The lever 146, fulcrumed at 147 in the bracket 148 projecting from the frame 45, is provided with a projecting stud 149, which serves as a journal for the roll 150 which engages a groove in the clutch collar, for the purpose of sliding it axially to engage the sprocket 142.

Occasions arise where it is desirable to provide for two sizes of finished product. This requires that the severing device be operated to sever the plastic band into lengths which will correspond with the finished product.

I therefore provide the clutch collar 145 with teeth 151 on its other face, which are adapted to engage corresponding teeth formed on the hub of a second sprocket 152, rotatable on the shaft 136 and rotated through the medium of the chain 153, and the sprocket 154 rigid with the roll shaft 140. The relative sizes of the sprockets in each pair governs the speed of rotation of the cam 135, and as the movement of the plastic band *b* is uniform, the length of the severed portions is varied according to the particular chain drive in operation. As the cam is rotated the connection operates on the arms 125—126 to engage the blade 128 with the moving plastic band. As it requires an appreciable time to sever the band, the blade as it engages the band, is drawn with it as it severs, operating through the arms 125—126 to swing the shaft 119 in the arms 118, and through them to rotate the shaft 116 in its bearings against the yielding resistance of the spring 123. This prevents the thickening of the band behind the blade 128, which, as it is raised to clear the moving band, is returned to normal position with the projections 120 and 121 in contact.

In some cases the character of the plastic is such that there is a tendency for the material to adhere to the blade as it rises, and I provide a stripper, Figs. 5, 6, 8, comprising a blade 155, slidably engaging at one edge with the severing blade 128. The stripper blade is provided near its ends with studs 156, slidable in the arms 125—126. These studs are shouldered at 157, and the stem 158 extending therefrom, serves as an arbor for the spring 159, socketed respectively in the arms 125—126, reacting on the internal shoulder 160. The stem 158 projects through the arm and the pin 161 limits the downward movement of the stripper. In order that there may be no contact of the stripper blade with the moving plastic band, I provide abutments 162 projecting upwardly from the frame members 45, which limits the downward movement of the stripper blade as the severing blade descends. These abutments are extended at 163 to permit the stripper blade to slide thereon as the severing blade is moved forward in the severing operation.

The character of the plastic band from which formed portions are cut is such that adhesion to the formed cutters is not anticipated, but it will be obvious that individual strippers may be adapted to operate with formed cutters in a manner similar to that described.

The severed sections are carried onward by the conveyor C to a position where they may be transferred to a suitable receiver, or to other apparatus for further operations, and at 164 I show a receiving table to which the sections are transferred.

Having described my invention, I claim:—

1. In a kneading machine, a kneading device; a hopper connected therewith, to receive plastic material; a plunger operating within the hopper; means for operating the kneading device; coordinated means for operating the plunger; and a yielding connection between the plunger and its operating means whereby a yielding pressure may be transmitted to plastic material in the hopper to supply the kneading device.

2. In a kneading machine, a kneading device; a hopper connected therewith, to receive plastic material; a plunger, yieldingly supported and operating within the hopper; means for operating the kneading device; and coordinated means operating on the plunger to apply a yielding pressure to plastic material in the hopper, for the purpose of supplying the kneading device therewith.

3. In a kneading machine, the combination of a chamber provided with an inlet hopper and an outlet; a kneading device operating within the chamber; a plunger operating within the hopper for the purpose of forcing plastic material into the kneading device; a fulcrumed lever to which the plunger is yieldingly connected; means for operating the kneading device for the purpose of kneading plastic material supplied thereto by the operation of the plunger, and thereafter expellling it from the chamber outlet; and coordinated means for rocking the lever on its fulcrum for the purpose of operating the plunger for the purpose of applying a yielding pressure on the plastic material in the hopper.

4. In a kneading machine, the combination of a kneading device; a hopper connected therewith for the purpose of containing a supply of plastic material; a pressure device operating to force the plastic material in the hopper to the kneading device, and comprising a plunger; a fulcrumed lever movably connected therewith; a cam shaft; a cam rigid therewith; operative connections between the fulcrumed lever and the cam by means of which the lever is rocked on its fulcrum as the cam shaft is rotated, and pressure applied to the plastic material by the plunger; means for operating the kneading device and means for rotating the cam shaft for the purpose set forth.

5. In a kneading machine, the combination of a kneading device; a hopper connected therewith for the purpose of containing a supply of plastic material; a pressure device operating to force the plastic material in the hopper to the kneading device, and comprising a plunger; a fulcrumed lever swiveled thereto; a cam shaft; a cam rigid therewith; a pair of hinged members, together forming a thrust connection between the lever and the cam, and whose line of force passes one side of the hinge joint; means for operating the kneading device, and means for rotating the cam for the purpose of rocking the lever on its fulcrum, and therethrough applying means for applying pressure to the plastic material in the hopper for the purpose set forth.

6. In a kneading machine, the combination of a kneading device; a hopper connected therewith for the purpose of containing a supply of plastic material; a pressure device operating to force the plastic material in the hopper to the kneading device, and comprising a plunger; a fulcrumed lever swiveled thereto; a cam shaft; a cam rigid therewith; a fulcrumed cam lever engaging therewith; a pair of hinged members, together forming a thrust member, and respectively swiveled to the levers, and whose line of force passes one side of the hinge joint; means for operating the kneading device, and means for rotating the cam for the purpose of applying pressure to the supply of plastic material in the hopper, through the intermediate connections.

7. In a kneading machine, a kneading device; a pair of plungers operating in connection with the kneading device for the purpose of supplying plastic material under pressure to the kneading device; means for operating the kneading device from a source of power; and coordinated means for operating the plungers alternately for the purpose of maintaining an approximately uniform pressure on the plastic material in the hopper.

8. In a kneading machine, the combination of a chamber provided with an inlet hopper and an outlet; a kneading device operating within the chamber; a plunger operating within the hopper for the purpose of forcing plastic material into the kneading device; a fulcrumed lever to which the plunger is swiveled; an auxiliary plunger swiveled to the lever between the main plunger and the fulcrum, for the purpose of suppressing plastic material that may be pressed outwardly from beneath the main plunger means for operating the kneading device from a source of power for the purpose of kneading plastic material supplied thereto by the plungers, and thereafter expelling it from the chamber outlet; and coordinated means for rocking the lever on its fulcrum for the purpose of operating the plungers for the purposes set forth.

9. In a kneading machine, the combination of a kneading device; a hopper connected therewith for the purpose of containing a supply of plastic material; a pressure device operating to force the plastic material in the hopper to the kneading device, and comprising a plunger; a fulcrumed lever, swiveled thereto; a cam shaft; a cam rigid therewith; a fulcrumed lever engaging the cam; a pair of hinged members, together forming a thrust member, and respectively swiveled to the levers, and whose line of force passes one side of the hinge joint; an arm projecting from the member swiveled to the cam lever, and adapted to engage a second cam rigid with the cam shaft, for the purpose of swinging the thrust members on their hinge and swivel connections with their respective levers, and thereby increasing the normal arc of travel of the fulcrumed lever to which is connected the plunger, which is thereby withdrawn from the hopper, permitting the introduction of plastic thereto, in the path of movement of the plunger.

10. In a kneading machine, the combination of a chamber provided with an inlet hopper and an outlet; a kneading device operating within the chamber; a plunger operating within the hopper for the purpose of forcing plastic material into the kneading device; a fulcrumed lever to which the plunger is swiveled; means for operating the kneading device for the purpose of kneading plastic material supplied thereto by the operation of the plunger, and thereafter expelling it from the chamber outlet; coordinated means for rocking the lever on its fulcrum for the purpose set forth; and means for controlling the swing of the plunger on its swivel connection as it is operated by the fulcrumed lever.

ERLAND F. PETERSON.